United States Patent Office 3,288,860
Patented Nov. 29, 1966

3,288,860
ALKALI METAL SALTS OF SULFINYL CARBANIONS AND ALKALI METAL ALKANESULFENATES, PROCESSES FOR THEIR PREPARATION AND REACTIONS THEREOF WITH ALKYL HALIDES
Warren I. Lyness, Mount Healthy, and David E. O'Connor and Jim S. Berry, Cincinnati, Ohio, assignors to The Procter & Gamble Company, Cincinnati, Ohio, a corporation of Ohio
No Drawing. Filed Mar. 30, 1965, Ser. No. 448,229
20 Claims. (Cl. 260—607)

This application is a continuation-in-part of copending application Serial Number 246,351, now abandoned, filed December 21, 1962.

This invention relates to sulfoxide derivatives useful as intermediates in the preparation of new compounds having outstanding utility in various fields. Specifically, this invention relates to salts of carbanions containing a sulfoxide group adjacent the carbon atom of the carbanion and to salts of alkanesulfenate ions. This invention also relates to methods for preparing said salts and to processes utilizing said salts.

The sulfoxide group is a very useful hydrophilic group for compounds having surface active properties, and an effective process for introducing a sulfoxide group into compounds having a long-chain hydrophobic group is very desirable. Previously, sulfoxides have been prepared by oxidation of the corresponding sulfide. However, this oxidation method almost inevitably produces a mixture containing some unreacted sulfides and/or some sulfone by-products which are generally undesirable. Since it is difficult to separate the long alkyl chain sulfides and sulfones from the desired sulfoxides this route to long chain sulfoxides is somewhat inefficient.

Therefore, it can be appreciated that an effective method for introducing a sulfoxide group at predetermined sites within a molecule is desirable. It can be equally appreciated that a method which permits the formation of certain compounds containing easily oxidized or easily cleaved groups in addition to the sulfoxide group is especially desirable. Furthermore, such a method is more desirable when it does not require the use of high temperatures, corrosive oxidizing agents, and specialized equipment.

Accordingly, it is an object of this invention to prepare salts of carbanions in which a sulfoxide group is adjacent to the carbon atom bearing the negative charge (hereinafter referred to as salts of sulfinyl carbanions) by methods which avoid the aforesaid defects and in which the advantages hereinafter indicated are inherent.

It is another object of this invention to provide processes for preparing detergent surfactants from said salts.

It is a yet further and ancillary object of this invention to provide certain new reactive compounds, alkali metal alkanesulfenates, which are by-products of a specific variation of the basic reaction for preparing salts of sulfinyl carbanions.

It is another object of this invention to provide a process for preparing detergent surfactants utilizing said by-products.

PREPARATION OF SALTS OF SULFINYL CARBANIONS

The principal object of this invention, i.e. the formation of the essential salts of sulfinyl carbanions can be achieved by reacting a base selected from the group consisting of sodium and potassium metals; alkali metal (e.g. sodium, potassium and lithium) amides; alkali metal hydrides; alkali metal alkyls (wherein the alkyl group contains from about 1 to about 6 carbon atoms); and alkali metal oxides with a sulfoxide compound having the formula

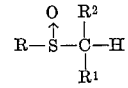

wherein R is a hydrocarbon group containing from 1 to about 30 carbon atoms, and wherein R is attached to the sulfur atom of the sulfoxide group by a single covalent bond between carbon and sulfur, wherein $R^1$ and $R^2$ are selected from the group consisting of hydrogen and hydrocarbon groups containing from about 1 to about 30 carbon atoms, and wherein R, $R^1$ and $R^2$ each contain from 0 to about 10 linkages selected from the group consisting of ether, thioether and imino linkages, and from 0 to about 5 amine groups each selected from the group consisting of primary, secondary and tertiary amine groups, and wherein the total number of carbon atoms in the sulfoxide compound does not exceed about 32 and no more than 2 of the R groups (R, $R^1$ and $R^2$) in the compound can contain aryl groups, the reaction being carried out at a temperature of from about 0° C. to about 100° C. R, $R^1$ and $R^2$ should not contain groups which are more reactive with said base than a hydrogen atom attached to a saturated carbon atom adjacent to the sulfoxide group. R, $R^1$ and $R^2$ have the above respective definitions throughout the specification and claims, except where otherwise specifically indicated.

The symbol used for the sulfoxide groups

is only a convenient representation of the structure for purposes of the description of the invention and is not necessarily indicative of the actual structure which is believed to involve a semi-polar bond. This symbol, or even more simply —SO—, is used hereinafter to represent the sulfoxide group.

The sulfoxide compounds which react with the base to form the salts of sulfinyl carbanions of this invention are characterized by the presence of a sulfoxide group intermediate two carbon atoms, at least one of said carbon atoms being saturated with zero to two hydrocarbon groups, the remaining groups on said saturated carbon atom being hydrogens. Preferably, at least one of the carbon atoms adjacent to the sulfoxide group will be saturated with hydrogen atoms, since the presence of an alkyl group, etc., may slow the reaction (hereinafter described) in which the salts of carbanions are formed. It has been found, surprisingly, that a hydrogen atom on said saturated carbon atom of such a sulfoxide containing molecule is sufficiently activated that certain strong bases (hereinbefore described) can remove said hydrogen atom to form the novel sulfinyl carbanion of this invention

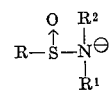

as its alkali metal salt,

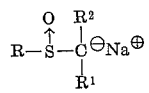

wherein M is an alkali metal, e.g., the sodium salt $$R-\overset{O}{\underset{R^1}{\overset{\uparrow}{S}}}-\overset{R^2}{\underset{}{C}}\ominus Na^\oplus$$

As used herein, the term "hydrocarbon groups" refers to both unsubstituted hydrocarbon groups and substituted hydrocarbon groups containing, for example, ether linkages. Preferably the substituent hydrocarbon groups (R) in the formulas above and below are alkyl chains, straight or branched, containing from 1 to about 22 carbon atoms (e.g., methyl, ethyl, n-propyl, isopropyl, n-butyl, isobutyl, n-pentyl, isopentyl, n-hexyl n-heptyl n-octyl isooctyl, 2-ethylhexyl, diisobutyl, n-nonyl, tripropylene, n-decyl, undecyl, n-dodecyl, tridecyl, n-tetradecyl, pentadecyl, n-hexadecyl, n-octadecyl, eicosyl, docosyl, vinyl, propenyl, octenyl, 10-undecenyl, 9-octadecenyl, cyclopentyl, cyclohexyl, cyclohexylmethyl, methylcyclohexyl, 2-cyclohexyldodecyl, 12-cyclohexyldodecyl, 4-dodecylcyclohexyl and propynyl). Examples of other groups include aryl groups containing 6 to 12 carbon atoms (e.g., phenyl, biphenyl and naphthyl); and alkyl aryl groups containing benzene or naphthalene groups with branched or straight alkyl chains of from 1 to about 18 carbon atoms (e.g., benzyl, 2-phenyl-dodecyl, 1-methyl-2-phenylethyl, 2-indenyl and naphthylmethyl). $R^1$ and $R^2$ are each selected from the group consisting of hydrogen and hydrocarbon groups which are the same as those examples given hereinbefore with respect to R. The presence of certain non-reactive groups in or on the substituent R, $R^1$ or $R^2$ groups is permissible. As an example of non-reactive groups, these substituent groups can contain up to about 10 ether and/or thioether linkages. Amino groups can be appended to the chain or imino $$(-\overset{H}{N}- \text{ or } -N=)$$

groups can form a part of the chain with open chain and/or cyclic configuration. (R, $R^1$ and $R^2$, have the above definitions throughout the specification and claims.) Thus, R, $R^1$ or $R^2$ can represent, for example, such groups as 3,6,9,12,15-pentathiaheptacosanyl; 3,6,9,12,15-pentaoxaheptacosanyl; 3,6,9-trithiaheptacosanyl; 3,6,9-trioxaheptacosanyl; 2-dodecyloxyethyl; 2-octadecyloxyethyl; 2-methoxyethyl; 2-ethoxyethyl; 2-hexyloxyethyl; 2-octyloxyethyl; 2-dodecylthioethyl; 2-octadecylthioethyl; 2-methylthioethyl; 2-ethylthioethyl; 2-hexylthioethyl; 2-octylthioethyl; 11-methoxyundecyl; 11-methylthioundecyl; 11-ethoxyundecyl; 9- or 10-methoxyoctadecyl; 9- or 10-ethoxyoctadecyl; 9- or 10-methylthiooctadecyl; 2-, 3-, or 4-methoxycyclohexyl; 3- or 4-methylthiocyclohexyl; 3-cyclohexyloxydecyl; 2,5,8,11,14-pentamethyl-3,6,9,12,15-pentaoxaheneicosanyl; 2-tetrahydrofuranyl; 2-tetrahydrothiophenyl; tetrahydropyranyl; 2-(tetrahydropyranyl)-ethyl; 2-(2-tetrahydrofuranyl)-ethyl; tetrahydrothiofuranyl; 3,6-dioxaheptyl; 3,6 - dithiaheptyl; 3,6,9 - triazaheneicosanyl; β-aminoethyl; β-aminopropyl; β-methylaminoethyl; β-methylaminopropyl; β-dimethylaminoethyl; β-dimethylaminopropyl; 5-amino-3-azapentyl; 5-dimethylamino-3-azapentyl; 5-dimethylamino-3-methazapentyl; 8-amino-3,6-diazaoctyl; 15-amino - 3,6,9,12 - tetrazapentadecyl; 4,6-dimethoxy-2-sym-triazinyl; 4,6-diamino-2-sym-triazinyl; 4-piperidyl; β-(N-piperidyl)-ethyl; β-(N-piperazinyl)-ethyl; β-(N-imidazolyl)-ethyl; β-(N-morpholino)-ethyl; β-(N-oxazolyl)-ethyl; β-(N-pyrrolidyl)-ethyl; and 2-thiazolyl. Additionally, R can represent, for example, β-N-anilinoethyl; β-N-anilinopropyl; β-N-pyridylethyl; 1-methoxy-2-indanyl; β-N-naphthylaminoethyl; 2-benzoxazolyl and 4,6-dianilino-2-sym-triazinyl.

It will be understood that more than one sulfoxide group can be present in the molecule of the sulfoxide starting compound. That is to say there can be more than one

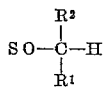

group. Preferably these additional groups are alkyl sulfinyl groups and more preferably they are methyl sulfinyl groups. However, the two sulfoxide groups should not be attached to the same carbon atom since the reactivity of the compound will then be enhanced as explained in U.S. Patent 3,124,618. Also, if there are not at least three aliphatic carbon atoms separating sulfoxide groups, then cleavage of the compound by the base may occur. Sulfoxide groups can be attached to adjacent carbon atoms on a benzene ring, however. Polymers containing multiple pendent alkyl sulfinyl groups, e.g., methyl sulfinyl groups, are desirable as sulfoxide starting compounds. The restriction on the number of carbon atoms which can be present in the molecule is, of course, different when more sulfoxide groups are present. The number of carbon atoms per sulfoxide group should not exceed 32, however.

The preferred sulfoxide starting compound is dimethyl sulfoxide,

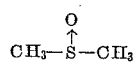

because it undergoes the aforementioned reaction with remarkable facility and is readily available. Other preferred sulfoxide starting compounds are alkyl methyl sulfoxides, R—SO—CH$_3$, wherein R contains from about 2 to about 22 carbon atoms (e.g., dodecyl methyl sulfoxide).

There will normally be either a stoichiometric amount or an excess of the sulfoxide starting material relative to the base to prevent free base from interfering with subsequent reactions of the salts of carbanions.

The reaction of the sulfoxide starting material with amide, hydride, oxide and alkyl bases proceeds as follows:

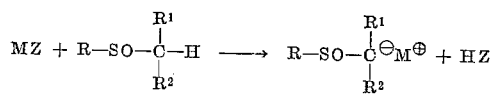

wherein M is an alkali metal and Z is selected from the group consisting of amide ($^\ominus$NH$_2$), hydride (H$^\ominus$), alkali metal oxide (MO$^\ominus$) and alkyl groups containing from 1 to 6 carbon atoms. Thus, HZ represents ammonia, hydrogen, alkali metal hydroxide and an alkane, respectively. (M and Z have the same definitions throughout the specification and claims.)

Sodium amide is a preferred base, especially for its commercial availability. Potassium amide is also preferred. The ammonia which is given off during the formation of a sulfinyl carbanion when sodium amide is used can be recycled to form additional sodium amide by reaction with sodium metal. Therefore, the net reaction, in effect, would be between sodium metal and a sulfoxide starting compound.

As mentioned previously, sodium and potassium metals can also serve to form the carbanion. The reaction of the sodium and/or potassium metal with a sulfoxide starting material can probably be represented as follows:

(1) 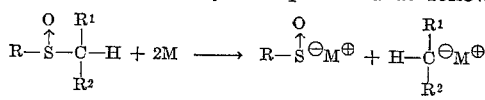

The compounds,

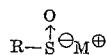

are new and useful compounds which undergo many of the same reactions as the salts of sulfinyl carbanions, as hereinafter described. These new compounds are alkali metal alkanesulfenates. It is understood that cleavage of the sulfoxide compound can occur on either side of the sulfinyl group and that accordingly for unsymmetrical sulfoxides there can be two alkali metal alkanesulfenates produced. The other alkanesulfenates will have the formula

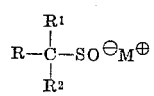

The other produce of Reaction (1) is a metal alkyl which reacts immediately with unreacted starting sulfoxide to form the sulfinyl carbanion salt as follows:

(2)
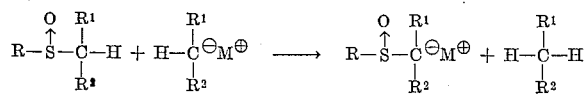

When M is potassium, these two reactions are the only ones occurring to any significant extent and accordingly, approximately equal molar amounts of potassium alkanesulfenate and potassium alkylsulfinylcarbanion are formed. However, when M is sodium it is believed, based on product yields, that about 30% to about 40% of the sodium reacts as follows:

(3)
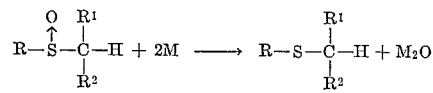

(4)
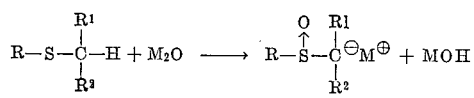

Reaction (4) is typical of the reactions of alkali metal oxides with sulfoxide starting material as hereinbefore described. Accordingly, a smaller molar percentage of the reaction with sodium will be alkanesulfenate salt than in the case of the reaction with potassium. The ratio of alkylsulfinylcarbanion salt to alkanesulfenate salt in the product of the reaction with sodium is normally about 2:1.

Because of the possible reduction of the sulfoxide with sodium metal it may not be preferred in some cases. However, the alkali metals are inexpensive and there are definite economic advantages in using the metals. The sodium metal is especially advantageous when the possibility of formation of small amounts of sulfides can be tolerated. Of course, mixtures or alloys of sodium and potassium can likewise be used, and are advantageous under some circumstances. Cesium and rubidium are believed to react in the same way as sodium and potasssium.

If, however, anhydrous ammonia is present in the reaction mixture with the sulfoxide starting compound when the sodium and potassium metal is added, the chances of the metal reducing and/or cleaving the sulfoxides are decreased. It is probable that the alkali metal may react first with the ammonia to form the amide which then reacts as hereinbefore described.

The reaction to form the salts of sulfinyl carbanions should be carried out in the absence of compounds which are more reactive with the essential bases than the hydrogen attached to a saturated carbon atom which is adjacent to the sulfoxide group. For instance, such reactive compounds as water, acids, alcohols, most ketones, and many halogen-containing compounds are more reactive with the strong bases needed to form the salts of sulfinyl carbanions than is the sulfoxide starting material. Consequently, their presence interferes with the reaction by preferentially reacting with the base and if they are present in sufficient amounts to completely react with the base would prevent the desired formation of a salt of a sulfinyl carbanion.

When dimethyl sulfoxide is used to form the salts of sulfinyl carbanions, an excess of dimethyl sulfoxide is an excellent solvent for the reaction and in most instances an excess of dimethyl sulfoxide is the preferred solvent. However, other non-reactive solvents or diluents can be used especially when other sulfoxide compounds are the source of the carbanion. These solvents should not contain any of the reactive groups contained in the reactive compounds hereinbefore mentioned either as a part of the structure of the solvent or as part of impurities present in the solvent if maximum yields are desired. The use of solvents which will react with the salts of sulfinyl carbanions is also generally undesirable. It is recognized, however, that certain reactive compounds can be present as a solvent or as a component of the solvent mixture to yield an in situ formation and the reaction of the salts of sulfinyl carbanions. For example, addition of dimethyl sulfoxide to a suspension of sodium amide in a mixture of benzene and dodecyl bromide produce an in situ formation of sodium methylsulfinylcarbanion and reaction with dodecyl bromide to give the product of the reaction of salts of methylsulfinylcarbanion with dodecyl bromide as is described more fully hereinafter.

Suitable non-reactive solvents or diluents are to be found in such classes of compounds as the aliphatic or aromatic hydrocarbons, aliphatic, aromatic or mixed aliphatic-aromatic ethers, cyclic ethers and amines. Examples of suitable non-reactive hydrocarbon solvents include hexane, petroleum ether, "Stoddard" solvent, benzene, toluene and mixed xylenes. Among the ether compounds which are suitable as solvents are diethyl ether, dibutyl ether, anisole, diphenyl ether, tetrahydrofuran, 1,2-dimethoxyethane and diethylene glycol dimethyl ether. Amine compounds which can serve as solvents for the formation and subsequent reaction of salts of sulfinyl carbanions include butylamine, N-methyl butylamine, anhydrous ethylene diamine, pyridine and morpholine. Anhydrous liquid ammonia can also be used as a solvent, and is especially suitable when the strong base is an alkali metal amide. Still another compound which is suitable is N,N-dimethyl formamide. Other similar non-reactive solvents or diluents can be used with substantially equivalent results.

The solvent used can affect the rate of formation of the salts of sulfinyl carbanions, depending on such factors as its ability to dissolve one or both reactants. The rate and course of subsequent reactions of the salts of sulfinyl carbanions can also be affected by the choice of solvent, as will be more fully described hereinafter in Example VII. The use of mixtures of two or more non-reactive compounds as the reaction medium is, of course, suitable and in some cases, is preferable to the use of a single species.

The reaction to form salts of sulfinyl carbanions is normally carried out at slightly above room temperature (25° C.) when metal amides, metal hydrides and metal oxides are used. Temperatures of 50° C. to 70° C. are preferred. When the free alkali metals or metal alkyls are used, somewhat lower temperatures are preferred because of the greater reactivity of these reactants. When using sodium metal or butyl lithium, for example, a preferred temperature range is about 20° to 30° C. When using potassium metal or a sodium-potassium alloy, a preferred temperature range is about 0° to 20° C.

Carbon-metal bonds are unstable at elevated temperatures and at 120° C., for instance, sodium methylsulfinylcarbanion is destroyed. Therefore, elevated temperatures above the decomposition temperature of the carbanion are undesirable. Lower temperatures than room temperature are not normally desirable when metal amides, metal hydrides and metal oxides are used, because the speed of the reaction is undesirably decreased. For instance, at 50° C. sodium hydride and dimethyl sulfoxide were completely reacted at the end of two hours as indicated by measurement of hydrogen evolution and high yields in subsequent reactions between the resulting sulfinyl carbanion and other compounds, whereas a similar experiment carried out at about room temperature (approximately 27° C.) was only 15% complete after two hours. Subsequent reactions of the carbanion with other compounds as hereinafter discussed are carried out in the same temperature ranges for the same reasons (about 0° C. to 100° C. depending upon the reactants).

The sodium and potassium salts of the sulfoxide carbanion are quite stable at temperatures as high as 50° C. for periods of time at least as long as a day. For example, when a solution of sodium methylsulfinylcarbanion (prepared by the process described above) in dimethyl sulfoxide was kept at 50° C. for 24 hours and then alkylated with dodecyl bromide as hereinafter described, an 82% yield of purified alkylation product was obtained as compared with yields of 86 to 90% purified product obtained with freshly prepared sodium methylsulfinylcarbanion. After storage of sodium methylsulfinylcarbanion at room temperature for five days, reaction with dodecyl bromide, as hereinafter more fully described, gave an 89% yield of alkylation product. The lithium methylsulfinylcarbanion appears to be somewhat less stable, but if it is used within a few hours after it is prepared, yields comparable to those obtained with the sodium salt can be observed.

Sodium and potassium salts of the sulfinyl carbanions are preferred for stability and cost considerations. Alkali metal sulfinyl carbanions prepared by the processes hereinbefore described are useful in the preparation of a great number of valuable organic compounds described hereinafter in co-pending applications, Serial Numbers 444,068, 444,069, 444,077, and 448,228, filed concurrently herewith.

REACTION BETWEEN ALKYL HALIDES AND SULFINYL CARBANIONS

The salts of sulfinyl carbanions of this invention can be used in many ways to prepare useful compounds. For instance, the salts of sulfinyl carbanions will react with a compound containing a halogen atom (excepting fluorine) attached to a primary alkyl carbon atom to alkylate the sulfinyl carbanion starting compound.

This reaction proceeds in a straightforward manner. The alkyl halide, as typified by an alkyl bromide, but which can be chloride or iodide, reacts with the alkali metal sulfinyl carbanion to form an alkali metal halide and to alkylate the carbanion.

These alkyl halides have the formula:

$$R^3—CH_2—X$$

wherein X is selected from the group consisting of bromine, chlorine and iodine atoms and $R^3$ is selected from the group consisting of hydrogen and alkyl an daryl-substituted alkyl hydrocarbon chains containing from 1 to about 30 carbon atoms wherein the carbon of $R^3$ joining $R^3$ to the $—CH_2X$ group is attached to the rest of the $R^3$ group by single covalent bonds. The alkyl portions of $R^3$ can contain from 0 to about 10 linkages selected from the group consisting of ether and thioether linkages. (X and $R^3$ have the above definition throughout the specification and claims, except where otherwise specifically indicated.) The reaction between the alkyl halide (e.g., bromide) and the sulfinyl carbanion (e.g., sodium salt) is as follows:

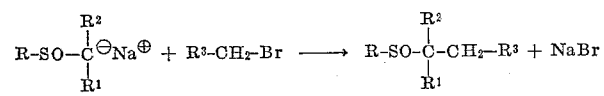

This reaction is carried out at a temperature of from about 0° C. to about 100° C. Any branched, ring, or straight chain hydrocarbon, whether saturated or unsaturated, containing a halogen atom attached to a primary, saturated alkyl carbon atom and fitting the description hereinbefore given will react in the above manner. Permissible substituent groups on these hydrocarbons include ether and thioether linkages. Examples of alkyl halide reactants suitable for use with the salts of sulfinyl carbanions include dodecyl bromide, dodecyl chloride, neopentyl chloride, docosyl bromide, octadecyl bromide, hexadecyl bromide, hexadecyl chloride, hexyl bromide, 3-(chloromethyl) heptane, amyl chloride, iso-amyl chloride, methyl chloride, methyl iodide, tetradecyl bromide, 1-bromo-3,6,9-trioxaheneicosane, 1-bromo-3,6,9,12-tetraoxatetracosane, 2-phenylethyl bromide, cyclohexylmethyl chloride, 3-pentenyl bromide, 9-octadecenyl bromide, 10-undecenyl bromide, 1-chloro-2-methoxydodecane, 9- or 10-methoxyoctadecyl bromide, 9- or 10-methylthiooctadecyl bromide, and 1-chloro-3,6-dioxaheptane. The products of these reactions either have useful and desirable surface active (including detergent) properties or are useful as intermediates in the preparation of surface active compounds. For example, alkyl methyl sulfoxides having an alkyl group of from about 8 to 18 carbon atoms are known detergent materials.

Alkyl halides containing from 1 to about 22 carbon atoms are preferred reactants, especially with the preferred sulfinyl carbanion salts hereinbefore described.

It will be understood that the alkyl halide compounds of this invention can contain more than one $—CH_2—X$ group so long as the carbon of $R^3$ joins $R^3$ to the rest of the $R^3$ groups by single covalent bonds and so long as the halogen atoms are not attached to adjacent carbon atoms. The presence of additional reactive sites simply allows the alkyl halide compound to react with more than one mole of alkylsulfinylcarbanion salt or alkanesulfenate as hereinafter described.

The products of this reaction are unique in that they are generally obtained in a much purer state than is possible by any previously known method of preparation. As a consequence, they are less likely to have an odor or to contain ineffective or undesirable by-products.

All of these reactions with the sulfinyl carbanions should be carried out in the absence of any other material, as hereinbefore described, which is preferentially more reactive with strong bases than the hydrogen atom attached to a saturated carbon adjacent to the sulfoxide group of the sulfoxide starting material.

Reaction between alkyl halides and alkali metal alkanesulfenates

The alkali metal alkanesulfenates of this invention can be used to form, e.g. detergent compounds, by reacting said salts with alkyl halides in reactions which are similar to the reactions between alkyl halides and salts of sulfinyl carbanions. The reactions proceed as follows:

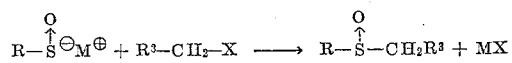

This alkylation reaction proceeds in a straightforward manner. The alkyl halides useful in this reaction are the same alkyl halides hereinbefore described and the reaction is carried out under the same conditions under which the reaction between alkyl halides and salts of sulfinyl carbanions are carried out.

As a result of the reaction between the alkali metal alkanesulfenates and the alkyl halides, the reaction between (1) an alkyl halide and (2) the product of the reaction between an alkali metal and a sulfoxide starting material will give a mixture of two sulfoxides which differ by a methylene group. Component (2) in the above reaction comprises a mixture of alkali metal alkanesulfenates and alkali metal alkysulfinylcarbanions as hereinbefore described.

It is possible, however, to preferentially react the carbanion from said mixture of alkali metal alkylsulfinylcarbanions and alkali metal alkanesulfenates first with a stoichiometric amount of a t-alkyl halide, water, sodium bisulfate, ethanol, acetone, acetic acid, or any compound which is more acidic than dimethyl sulfoxide to leave essentially only alkanesulfenate ions which can then be reacted, e.g., according to the above alkylation reaction. For example, the reaction of potassium metal with dimethyl sulfoxide, destruction of the methylsulfinylcarbanion with t-butyl bromide, and subsequent reaction of the alkanesulfenate ion with pentyl bromide is as follows (1)

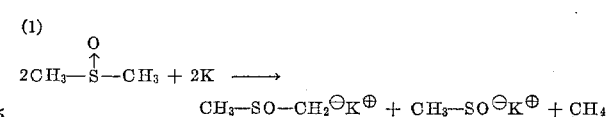

(2)

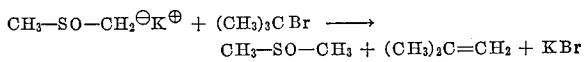

(3)

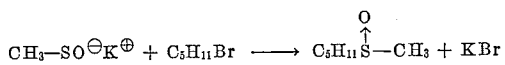

This is the reaction of Example IX. Reaction (2) is an example of an elimination reaction which can occur when an alkyl halide wherein the halogen atom is not attached to a primary carbon atom is reacted with an alkylsulfinylcarbanion salt.

All of the dialkyl sulfoxide compounds which can be prepared by this invention have utility either as surface active agents; or as solvents; or as plasticizers for resins or polymers. The optimum utility will depend upon the type of structure. Those compounds containing one long hydrophobic group will normally have surface active properties. Those compounds that are liquids will have utility as solvents, or if they are of sufficient bulk to be non-volatile, will be useful as plasticizers. Examples of solvents include ethyl methyl sulfoxide, hexyl methyl sulfoxide and diisopropyl sulfoxide. All compounds having a hydrogen atom attached to a carbon atom adjacent to the sulfoxide group as hereinbefore described will be capable of forming a salt of a sulfinyl carbanion and are therefore intermediates in the preparation of a wide variety of compounds. Those sulfoxide compounds which have a sufficiently large bulk will have utility as textile softeners (e.g., bis-dodecylsulfoxide, bis-octadecyl sulfoxide, octadecyl methyl sulfoxide and tetradecyl heptyl sulfoxide).

The following examples are illustrative, but not limiting, of the practice of this invention.

*Example I*

(A) A 250 ml., three-necked flask fitted with a stirrer, a dropping funnel, and a thermometer was swept thoroughly with nitrogen and maintained in an air free condition by a mercury-filled trap. The flask was charged with 100 ml. of dry dimethyl sulfoxide and 9.4 g. (0.25 mole) of sodium amide. The mixture was heated to about 50° C. and maintained at that temperature for two hours. Evolution of ammonia began almost immediately and continued throughout most of the period. The reaction product was in the form of a solution of sodium methylsulfinylcarbanion in dimethyl sulfoxide. A small amount of ammonia remained in this solution.

Analysis showed that the solution contained approximately 0.25 mole of sodium methylsulfinylcarbanion. It was used without further modification in subsequent reactions.

When either lithium amide or potassium amide is substituted for the sodium amide, substantially equivalent results are obtained.

(B) The above process was repeated substituting 6.0 g. (0.25 mole) sodium hydride (as a 54.5% dispersion in mineral oil) for the sodium amide. Hydrogen gas was evolved rather than ammonia.

This solution also contained 0.25 mole of sodium methylsulfinylcarbanion. In further reactions it behaved in substantially the same way as the reaction solution described in Example I(A).

When either potassium hydride or lithium hydride is substituted for the sodium hydride, substantially equivalent results are obtained.

(C) Ammonia was bubbled into 50 ml. of dimethyl sulfoxide at room temperature until it was approximately saturated. 1.2 g. of sodium was added to the solution and the mixture was stirred while the sodium was slowly consumed. Several hours at room temperature were required for a complete reaction. The product was sodium methylsulfinylcarbanion in good yield. When potassium is substituted for the sodium in this example, substantially equivalent results are obtained.

(D) 2.3 g. (0.1 mole) of sodium metal was added to 100 ml. of dry dimethyl sulfoxide under nitrogen. The sodium was slowly consumed, at room temperature, over a period of several hours. 700 ml. of methane gas was evolved. The product of this initial reaction was a mixture comprising sodium methylsulfinylcarbanion, sodium methanesulfenate and dimethyl sulfide. When the sodium was completely reacted, pentyl bromide was added and the reaction mixture was stirred an additional several hours. Next, a vacuum was applied through a Dry Ice trap by means of an aspirator and the dimethyl sulfide was trapped. The dimethyl sulfide was identified by reacting it with $HgCl_2$ and obtaining the melting point of the resulting complex $2(CH_3)_2S \cdot 3HgCl_2$ (M.P. 157°–158° C. vs. literature value of 158°–159° C.). The alkylated reaction mixture was then taken up in ether and filtered. Additional NaBr precipitated when the ether was added. The ether was evaporated and the liquid residue was put through a vapor phase chromatographic unit. Based upon the vapor phase chromatography results, the yield of

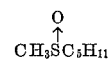

was 0.025 mole and the yield of

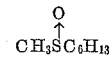

was 0.052 mole. Both of these sulfoxides were subsequently separated from the reaction mixture by distillation and identified by means of their infrared spectra and elemental analyses. The yield of alkylated sulfoxide was 77% of theoretical.

(E) 3.9 g. (0.1 mole) of potassium metal was added to a mixture of 100 ml. of tetrahydrofuran and 50 ml. of dimethyl sulfoxide under nitrogen. At a temperature of less than 10° C. the reaction was quite vigorous and 1200 ml. of methane was evolved. The product of this reaction was essentially a mixture of potassium methylsulfinylcarbanion and potassium methanesulfenate. When the reaction was complete, pentyl bromide was added and the reaction mixture was stirred for several hours. Upon working up the reaction mixture as in (D), the yield was determined to be 0.049 mole

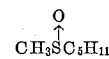

and 0.037 mole

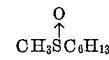

The combined yield of alkylated product was 86%. Only a trace of dimethyl sulfide was detected.

Examples I(D) and I(E) demonstrate the preparation of alkali metal (e.g., sodium and potassium) alkanesulfenates (e.g., methanesulfenates) and their subsequent reaction with alkyl halides (e.g., pentyl bromide) to form longer chain sulfoxide compounds and mixtures of sulfoxides compounds.

The sodium, potassium and lithium methylsulfinylcarbanions are useful as intermediates in forming, by alkylation with dodecyl bromide for example, detergent compounds useful in laundering. (See Example IV.)

When in the above examples the following groups are substituted for one methyl group in the dimethyl sulfoxide, and/or when the following groups are also substituted for one and/or two hydrogen atoms on the other methyl group in the dimethyl sulfoxide so that the total number of carbon atoms in the resulting sulfoxide compound is less than 32 and so that there are no more than two aromatic groups present in the molecule, substantially the same results are achieved in that the corresponding alkali metal sulfinyl carbanions and alkali metal alkanesulfenates are produced and upon reaction with pentyl bromide the corresponding sulfoxide compounds containing an additional pentyl group are produced: methyl; ethyl; n-propyl; isopropyl; n-butyl; isobutyl; n-pentyl; isopentyl; n-hexyl; n-heptyl; n-octyl; isooctyl; 2-ethylhexyl; diisobutyl; n-nonyl; tripropylene; n-decyl; undecyl; n-dodecyl; tridecyl; n-tetradecyl; pentadecyl; n-hexadecyl; n-octadecyl; eicosyl; docosyl; vinyl; propenyl; octenyl; 10-undecenyl; 9-octadecenyl; cyclopentyl; cyclohexyl; cyclohexylmethyl; methylcyclohexyl; 2-cyclohexyldodecyl; 12 - cyclohexyldodecyl; 4 - dodecylcyclohexyl; propynyl; phenyl; biphenyl; naphthyl; benzyl; 2-phenyl-dodecyl; 1-methyl-2-phenylethyl; 2-indenyl; naphthylmethyl; 3,6,9,12,15-pentathiaheptacosanyl; 3,6,9,12,15-pentaoxaheptacosanyl; 3,6,9 - trithiaheptacosanyl; 3,6,9-trioxaheptacosanyl; 2-dodecyloxyethyl; 2-octadecyloxyethyl; 2-methoxyethyl; 2-ethoxyethyl; 2-hexyloxyethyl; 2-octyloxyethyl; 2-dodecylthioethyl; 2-octadecylthioethyl; 2-methylthioethyl; 2-ethylthioethyl; 2-hexylthioethyl; 2-octylthioethyl; 11 - methoxyundecyl; 11 - methylthioundecyl; 11-ethoxyundecyl; 9- or 10-methoxyoctadecyl; 9- or 10-ethoxyoctadecyl; 9- or 10-methylthiooctadecyl; 2-, 3-, or 4-methoxycyclohexyl; 3- or 4-methylthiocyclohexyl; 3-cyclohexyloxydecyl; 2,5,8,11,14-pentamethyl-3,6,9,12,15-pentaoxaheneicosanyl; 2-tetrahydrofuranyl; 2-tetrahydrothiophenyl; tetrahydropyranyl; 2 - (tetrahydropyranyl)-ethyl; 2-(2-tetrahydrofuranyl)-ethyl; tetrahydrothiofuranyl; 3,6-dioxaheptyl; 3,6-dithiaheptyl; 3,6,9-triazaheneicosanyl; β-aminoethyl; β-aminopropyl; β-methylaminoethyl; β - methylaminopropyl; β - dimethylaminoethyl; β-dimethylaminopropyl; 5-amino-3-azapentyl; 5-dimethylamino-3-azapentyl; 5-dimethylamino-3-methazapentyl; 8-amino-3,6-diazaoctyl; 15-amino-3,6,9,12-tetrazapentadecyl; 4,6 - dimethoxy - 2 - sym-triazinyl; 4,6 - diamino-2-sym-triazinyl; 4-piperidyl; β-(N-piperidyl)-ethyl; β-(N-piperazinyl)-ethyl; β-(N-imidazolyl)-ethyl; β-(N-morpholino)-ethyl; β-(N-oxazolyl)-ethyl; β-(N-pyrrolidyl)-ethyl; 2-thiazolyl; β-N-anilinoethyl; β-N-anilinopropyl; β-N-pyridylethyl; 1-methoxy-2-indanyl; β-N-naphthylaminoethyl; 2-benzoxazolyl; 4,6-dianilino-2-sym-triazinyl; and mixtures thereof.

Example II

Using the apparatus of Example I, 3.3 ml. of a 1.5 M solution of n-butyllithium in hexane was added to a solution of 12.3 g. (0.05 mole) methyl tridecyl sulfoxide in 100 ml. benzene at room temperature and the mixture was stirred in additional one hour. The product was a solution of tridecylsulfinylcarbanion, lithium salt, in benzene and butane. Subsequent alkylation with a stoichiometric amount of dodecyl bromide gave bis-tridecyl sulfoxide. (See Example V.)

The bis-tridecyl sulfoxide is useful as a textile softener and plasticizer for resins.

When either 1,2-dimethoxyethane, hexane, petroleum ether, xylene, diphenyl ether, tetrahydrofuran, butylamine, N,N-dimethyl formamide, diethylene glycol dimethyl ether (diglyme) or mixtures thereof are substituted either wholly, or in part, for the benzene in this example, substantially equivalent results are obtained in that the lithium tridecylsulfinylcarbanion is formed and reacted. Also, when either heptadecyl heptyl sulfoxide or bis-tridecyl sulfoxide is substituted for the methyl tridecyl sulfoxide of this example, substantially equivalent results are obtained, in that the corresponding carbanions are formed and reacted.

When methyl, ethyl, vinyl, propyl, isopropyl, isobutyl, t-butyl, pentyl, hexyl or phenyl lithium is substituted for the butyl lithium of this example, substantially equivalent products are obtained with the corresponding alkane by-product. Likewise, the corresponding alkylpotassiums and alkylsodiums produce substantially equivalent solutions of the tridecyl sulfinyl carbanion salts and, after alkylation, the bis-tridecyl sulfoxide product.

Example III

Using the apparatus of Example I, 16.7 g. (0.10 mole) of heptyl methyl sulfoxide was added to a suspension of 4.9 g. (0.11 mole) sodium hydride in 100 ml. of diglyme at 100° C. The theoretical quantity of hydrogen was evolved in about two hours. The product was a solution of heptylsulfinylcarbanion, sodium salt, in diglyme.

When octadecyl methyl sulfoxide, tetrapropylene methyl sulfoxide, toluyl methyl sulfoxide, dodecyl phenyl methyl sulfoxide, phenyl methyl sulfoxide, naphthyl methyl sulfoxide, benzyl methyl sulfoxide, phenyl methyl sulfoxide, dodecyl ethyl sulfoxide, 2-phenyldodecyl methyl sulfoxide, and naphthyl propyl sulfoxide are substituted for the heptyl methyl sulfoxide in this example, substantially equivalent results are obtained except that the corresponding octadecylsulfinylcarbanion, tetrapropylenesulfinylcarbanion, toluylsulfinylcarbanion, dodecylphenylsulfinylcarbanion, phenylsulfinylcarbanion, naphthylsulfinylcarbanion, phenyl-methylsulfinyl-carbanion, 2-phenyldodecylsulfinylcarbanion, phenylsulfinylcarbanion, dodecylsulfinyl-methyl-carbanion, and naphthylsulfinyl-ethyl-carbanion are produced as their sodium salts.

Example IV 24.9 g. (0.10 mole) of dodecyl bromide was added to a solution of 0.125 mole methylsulfinylcarbanion (sodium salt) in 100 ml. of dimethyl sulfoxide at room temperature (27° C.) over a period of about an hour and stirring was continued for two hours, at which time the reaction was essentially complete. After the reaction mixture had stood overnight at room temperature, 100 ml. of water was added and the mixture was extracted three times with ethyl acetate. The combined extracts were dried over magnesium sulfate, the solvent was removed under vacuum, and the remaining solid was recrystallized from hexane to yield 21.7 g. (88%) of methyl tridecyl sulfoxide with a melting point of 60–61° C. Analysis of the material showed C, 67.4%; H, 11.8%; and S, 13.0%, as compared to calculated values of 68.3%, 12.2% and 13.1%, and the product contained an infrared absorption band at 9.4μ which is characteristic of the sulfoxide group.

When the above reaction was repeated using dodecyl chloride in place of dodecyl bromide, substantially equivalent results were obtained. When octadecyl, 2-phenylethyl, cyclohexylmethyl or hexyl bromides, chlorides or iodides are substituted for the dodecylbromide in the above reaction, the corresponding methyl nonadecyl, methyl 3-phenylpropyl, methyl 2-cyclohexylethyl and methyl heptyl sulfoxides are formed. The methyl higher alkyl sulfoxides are excellent detergents, particularly when combined with about three times as much sodium tripolyphosphate to form a laundry product.

Also when in the above example the following alkyl halides are substituted either wholly, or in part, for the dodecyl bromide in the above reaction, substantially the same results are obtained in that the methylsulfinylcarbanion is alkylated with the alkyl group from the following alkyl halide reactants: neopentyl chloride, docosyl bromide, hexadecyl bromide, hexadecyl chloride, 3-(chloromethyl) heptane, amyl chloride, iso-amyl chloride, methyl chloride, methyl iodide, tetradecyl bromide, 1-bromo-3,6,9-trioxaheneicosane, 1-bromo-3,6,9,12 - trioxatetracosane, 2-phenylethyl bromide, cyclohexylmethyl chloride, 3-pentenyl bromide, 9-octadecenyl bromide, 10-undecenyl bromide, 9- or 10-methoxyoctadecyl bromide, 9- or 10-methylthiooctadecyl bromide, 1-chloro-3,6-dioxaheptane, and mixtures thereof.

Example V 12.5 g. (0.05 mole) of dodecyl bromide was added dropwise to the solution of tridecylsulfinylcarbanion produced in Example II and stirred for two hours at room temperature, at which time the reaction was essentially complete. After the reaction mixture had stood overnight at room temperature, 200 ml. of water was added, the mixture was extracted three times with ethyl acetate and the extracts were dried and the solvent stripped.

Recrystallization from hexane yielded 12.5 g. (65%) bis-tridecyl sulfoxide (melting point: 94–94.5° C.). Recovery of 4.6 g. tridecyl methyl sulfoxide made the yield 97%, based on unrecovered starting material.

*Example VI*

84 g. (0.60 mole) of methyl iodide was added dropwise to 0.65 mole sodium methylsulfinylcarbanion in dimethyl sulfoxide, prepared as described in Example I(B) and the reaction mixture was stirred for two hours, at which time the reaction was essentially complete. The reaction mixture was allowed to stand overnight at room temperature and then, 10 ml. of water was added and the entire mixture was distilled. The dimethyl sulfoxide and the methyl ethyl sulfoxide were codistilled at 39° C. to 51° C. at 1.5 mm. of mercury. Gas chromatography of the distillate showed the presence of two major components; one of which had a retention time identical to that of dimethyl sulfoxide. The other component was methyl ethyl sulfoxide. Calculations based on peak area indicated that essentially a quantitative conversion of the carbanion to methyl ethyl sulfoxide had occurred.

The methyl ethyl sulfoxide is useful as a solvent and as an intermediate for forming a surface active agent. The methyl ethyl sulfoxide will react with the bases of this invention to form a carbanion which can subsequently be alkylated by reaction with, for example, dodecyl bromide.

*Example VII*

Dodecyl bromide was reacted with a solution of 0.10 mole methylsulfinylcarbanion (sodium salt) in 100 ml., respectively, of (1) diethylene glycol dimethyl ether; (2) 1,2-dimethoxyethane; and (3) benzene. In solutions (1) and (2) the dodecyl bromide was added without solvent, but in (3) 50 ml. of benzene was used to dilute the dodecyl bromide.

The following table summarized the percent of mono- and dialkylation products which were formed in each solvent based on alkyl bromide used.

| Solvent | Mono- | Di- |
|---|---|---|
|  | Percent | Percent |
| (1) | 22 | 50 |
| (2) | 40 | 26 |
| (3) | 47 | 15 |

Thus, with increasing polarity of the solvent (3<2<1) the relative amount of dialkylation product increases. In order for dialkylation to occur, a carbanion of the monoalkylation product must be formed and this carbanion is then alkylated.

*Example VIII*

6.2 g. (0.1 mole) of sodium oxide was added to 100 ml. of dimethyl sulfoxide and the mixture was heated at 50° C. for 18 hours while stirring. The product of this reaction comprised sodium methylsulfinylcarbanion. The mixture was cooled to room temperature, 15.1 g. (0.1 mole) of 1-bromopentane was added and stirring was continued for three hours. The mixture was filtered to remove sodium hydroxide and unreacted sodium oxide and the filtrate was poured into water, extracted with ethyl acetate and dried over magnesium sulfate. The solvent was evaporated and the residue was identified as being primarily hexyl methyl sulfoxide by analysis by gas chromatography. The yield was around 29%.

When, in the above reaction, potassium and/or lithium oxides are substituted, either wholly or in part for the sodium oxide, substantially equivalent results are obtained except that the corresponding potassium and/or lithium methylsulfinylcarbanion salts are prepared and reacted with the 1-bromopentane.

*Example IX*

2.0 g. (0.05 g.-atom) of potassium in the form of approximately ¼ inch cubes was added to a stirred solution of 50 ml. each of dimethyl sulfoxide and tetrahydrofuran at 0–10° C. The product of this reaction comprised a mixture of approximately equimolar amounts of potassium methylsulfinylcarbanion and potassium methanesulfenate. After about one hour, 3.4 g. (0.025 mole) of t-butyl bromide was added at about 0° C. and stirring was continued for an additional hour. The product of the reaction at this point contained essentially no potassium methylsulfinylcarbanion, but did contain potassium methanesulfenate. Next 4.5 g. (0.030 mole) of 1-bromopentane was added and the resulting mixture was stirred overnight at room temperature. The mixture was filtered and most of the tetrahydrofuran was evaporated. Analysis by vapor phase chromatography indicated that the residue contained about 0.024 mole (95% of the theoretical yield) of pentyl methyl sulfoxide and little or no hexyl methyl sulfoxide. This indicates that the potassium methylsulfinylcarbanion was preferentially reacted with the t-butyl bromide, freeing the potassium methanesulfenate for subsequent reactions.

When in the above reaction, water and/or sodium bisulfate are substituted either wholly or in part for a stoichiometric equivalent of the t-butyl bromide, substantially equivalent results are obtained in that the methylsulfinylcarbanion is preferentially reacted leaving the methanesulfenate ion for subsequent reactions.

What is claimed is:

1. A compound having the formula

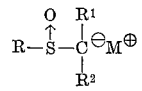

wherein R is an organic group consisting of moieties selected from the group consisting of (A) alkyl moieties selected from the group consisting of straight chain and branched chain alkyl moieties containing from 1 to about 22 carbon atoms; (B) cycloaliphatic moieties containing from 5 to about 22 carbon atoms; (C) aryl moieties selected from the group consisting of phenyl, naphthyl, and biphenyl moieties; (D) unsaturated hydrocarbon moieties selected from the group consisting of straight chain and branched chain hydrocarbon moieties containing from 2 to about 22 carbon atoms and containing a double bond; (E) unsaturated hydrocarbon moieties selected from the group consisting of straight chain and branched chain hydrocarbon moieties containing from 2 to about 22 carbon atoms and containing a triple bond in an interior position; (F) heterocyclic moieties selected from the group consisting of (1) five and (2) six membered rings containing from 1 to 3 hetero atoms selected from the group consisting of sulfur, nitrogen and oxygen and wherein said hetero atoms are attached only to carbon atoms and hydrogen atoms; (G) from 1 to about 10 moieties selected from the group consisting of ether, thioether and imino linkages; (H) saturated alkylene moieties containing from 1 to about 12 carbon atoms; and (I) from 1 to about 5 amino group moieties; said moieties being attached to each other and to the sulfinyl group to form a complete group R according to the following: (a) a moiety selected from the group consisting of (A), (B), (C), (D), (E) and (F) can be the entire R group; (b) a moiety selected from the group consitsing of (A), (B), (C), (D), (E), (F) and (H) can be attached directly to the sulfinyl group by means of a carbon atom; (c) a moiety selected from the group consitsing of (A), (B), (C), (D), (E) and (F) can be attached to a (G) moiety which is attached as hereinafter described; (d) a moiety selected from the group consisting of (A), (D) and (E) can be attached to a moiety selected from the group consisting of (B), (C) and (F); (e) moiety (G) is attached to two carbon atoms in an acyclic structure, said moiety being separated from other (G) moieties and the sulfinyl group by at least two carbon atoms; (f) moiety (H) is attached to two moieties, one of which is selected from the group consisting of (B), (C), (F), (G) and the sulfinyl group, and the other of which is selected from the group consisting of (B), (C), (F) and (G); and (g) wherein moiety (I) is attached as a substituent to a moiety selected from the group consisting of (A), (B), (C), (D), (E), (F) and (H); said organic group containing from 1 to about 30 carbon atoms, and wherein R is attached to the sulfur atom of the sulfoxide group by a single covalent bond between carbon and sulfur, where $R^1$ and $R^2$ are each selected from the group consisting of hydrogen and organic groups having the same definition as R and wherein the total number of carbon atoms in the sulfoxide compound does not exceed about 32, and not more than two of the organic groups in the compound contain aryl moieties, and wherein M is an alkali metal.

2. The compound of claim 1 wherein R is an organic group consisting of moieties selected from the group consisting of (A) alkyl moieties selected from the group consisting of straight chain and branched chain alkyl moieties containing from 1 to about 22 carbon atoms; (B) cycloaliphatic moieties containing from 5 to about 22 carbon atoms; (C) aryl moieties selected from the group consisting of phenyl, naphthyl and biphenyl moieties; (D) unsaturated hydrocarbon moieties selected from the group consisting of straight chain and branched chain hydrocarbon moieties containing from 2 to about 22 carbon atoms and containing a double bond; (E) unsaturated hydrocarbon moieties selected from the group consisting of straight chain and branched chain hydrocarbon moieties containing from 2 to about 22 carbon atoms and containing a triple bond in an interior position; (F) heterocyclic moieties selected from the group consisting of sym-triazinyl, piperidinyl, imidazolyl, morpholino, pyrrolidyl, pyridyl, furyl, tetrahydrofuranyl, tetrahydropyranyl, oxazolyl, thiazolyl, tetrahydrothiophenyl, tetrahydrothiofuranyl, and benzoxazolyl moieties; (G) from 1 to about 10 moieties selected from the group consisting of ether, thioether and imino linkages; (H) saturated alkylene moieties containing from 1 to about 12 carbon atoms; and (I) from 1 to about 5 amino group moieties; said moieties being attached to each other and to the sulfinyl group to form a complete group R according to the following: (a) a moiety selected from the group consisting of (A), (B), (C), (D), (E) and (F) can be the entire R group; (b) a moiety selected from the group consisting of (A), (B), (C), (D), (E), (F) and (H) can be attached directly to the sulfinyl group by means of a carbon atom; (c) a moiety selected from the group consisting of (A), (B), (C), (D), (E) and (F) can be attached to a (G) moiety which is attached as hereinafter described; (d) a moiety selected from the group consisting of (A), (D) and (E) can be attached to a moiety selected from the group consisting of (B), (C), and (F); (e) moiety (G) is attached to two carbon atoms in an acyclic structure, said moiety being separated from other (G) moieties and the sulfinyl group by at least two carbon atoms; (f) moiety (H) is attached to two moieties, one of which is selected from the group consisting of (B), (C), (F), (G) and the sulfinyl group, and the other of which is selected from the group consisting of (B), (C), (F) and (G); and (g) wherein moiety (I) is attached as a substituent to a moiety selected from the group consisting of (A), (B), (C), (D), (E), (F) and (H); said organic groups containing from 1 to about 30 carbon atoms, and wherein R is attached to the sulfur atom of the sulfoxide group by a single covalent bond between carbon and sulfur, and wherein $R^1$ and $R^2$ are each selected from the group consisting of hydrogen and organic groups having the same definition as R.

3. The compound of claim 1 wherein R is an organic group containing moieties selected from the group consisting of methyl;
ethyl;
n-propyl;
isopropyl;
n-butyl;
isobutyl;
n-pentyl;
isopentyl;
n-hexyl;
n-heptyl;
n-octyl;
isooctyl;
2-ethylhexyl;
diisobutyl;
n-nonyl;
tripropylene;
n-decyl;
undecyl;
n-dodecyl;
tridecyl;
n-tetradecyl;
pentadecyl;
n-hexadecyl;
n-octadecyl;
eicosyl;
docosyl;
vinyl;
propenyl;
octenyl;
10-undecenyl;
9-octadecenyl;
cyclopentyl;
cyclohexyl;
cyclohexylmethyl;
methylcyclohexyl;
2-cyclohexyldodecyl;
12-cyclohexyldodecyl;
4-dodecylcyclohexyl;
propynyl;
phenyl;
biphenyl;
naphthyl,
benzyl;
2-phenyldodecyl;
1-methyl-2-phenylethyl;
2-indenyl;
naphthylmethyl;
3,6,9,12,15-pentathiaheptacosanyl;
3,6,9,12,15-pentaoxaheptacosanyl;
3,6,9-trithiaheptacosanyl;
3,6,9-trioxaheptacosanyl;
2-dodecyloxyethyl;
2-octadecyloxyethyl;
2-methoxyethyl;
2-ethoxyethyl;
2-hexyloxyethyl;
2-octyloxyethyl;
2-dodecylthioethyl;
2-octadecylthioethyl;
2-methylthioethyl;
2-ethylthioethyl;
2-hexylthioethyl;
2-octylthioethyl;
11-methoxyundecyl;
11-methylthioundecyl;
11-ethoxyundecyl;
9-methoxyoctadecyl;
10-methoxyoctadecyl;
9-ethoxyoctadecyl;
10-ethoxyoctadecyl;
9-methylthiooctadecyl;
10-methylthiooctadecyl;
2-methoxycyclohexyl;
3-methoxycyclohexyl;
4-methoxycyclohexyl;
3-methylthiocyclohexyl;
4-methylthiocyclohexyl;
3-cyclohexyloxydecyl;
2,5,8,11,14-pentamethyl-3,6,9,12,15-pentaoxaheneicosanyl;
2-tetrahydrofuranyl;
tetrahydropyranyl;
β-(tetrahydropyranyl)-ethyl;
β-(2-tetrahydrofuranyl)-ethyl;
tetrahydrothiofuranyl;
3,6-dioxaheptyl;
3,6-dithiaheptyl;
3,6,9-triazaheneicosanyl;
β-aminoethyl;
β-aminopropyl;
β-methylaminoethyl;
β-methylaminopropyl;
β-dimethylaminoethyl;
β-dimethylaminopropyl;
5-amino-3-azapentyl;
5-dimethylamino-3-azapentyl;
5-dimethylamino-3-methazapentyl;
8-amino-3,6-diazaoctyl;
15-amino-3,6,9,12-tetrazapentadecyl;
4,6-dimethoxy-2-sym-triazinyl;
4,6-diamino-2-sym-triazinyl;
4-piperidyl;
β-(N-piperidyl)-ethyl;
β-(N-piperazinyl)-ethyl;
β-(N-imidazolyl)-ethyl;
β-(N-morpholino)-ethyl;
β-(N-oxazolyl)-ethyl;
β-(N-pyrrolidyl)-ethyl;
2-thiazolyl;
β-(N-anilino)-ethyl;
β-N-anilinopropyl;
β-N-pyridylethyl;
1-methoxy-2-indanyl;
β-N-naphthylaminoethyl;
2-benzoxazolyl;
4,6-dianilino-2-sym-triazinyl;

and mixtures thereof, and wherein $R^1$ and $R^2$ are each selected from the group consisting of hydrogen and organic groups having the same definition as R.

4. The compound of claim 1 in which $R^1$ and $R^2$ are hydrogen atoms.

5. The compound of claim 4 wherein R is an alkyl group containing from 1 to about 2 carbon atoms.

6. A compound having the formula

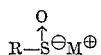

wherein R is an organic group consisting of moieties selected from the group consisting of (A) alkyl moieties selected from the group consisting of straight chain and branched chain alkyl moieties containing from 1 to about 22 carbon atoms; (B) cycloaliphatic moieties containing from 5 to about 22 carbon atoms; (C) aryl moieties selected from the group consisting of phenyl, naphthyl and biphenyl moieties; (D) unsaturated hydrocarbon moieties selected from the group consisting of straight chain and branched chain hydrocarbon moieties containing from 2 to about 22 carbon atoms and containing a double bond; (E) unsaturated hydrocarbon moieties selected from the group consisting of straight chain and branched chain hydrocarbon moieties containing from 2 to about 22 carbon atoms and containing a triple bond in an interior position; (F) heterocyclic moieties selected from the group consisting of (1) five and (2) six membered rings containing from 1 to 3 hetero atoms selected from the group consisting of sulfur, nitrogen and oxygen and wherein said hetero atoms are attached only to carbon atoms and hydrogen atoms; (G) from 1 to about 10 moieties selected from the group consisting of ether, thioether and imino linkages; (H) saturated alkylene moieties containing from 1 to about 12 carbon atoms; and (I) from 1 to about 5 amino group moieties; said moieties being attached to each other and to the sulfinyl group to form a complete group R according to the following: (a) a moiety selected from the group consisting of (A), (B), (C), (D), (E) and (F) can be the entire R group; (b) a moiety selected from the group consisting of (A), (B), (C), (D), (E), (F) and (H) can be attached directly to the sulfinyl group by means of a carbon atom; (c) a moiety selected from the group consisting of (A), (B), (C), (D), (E) and (F) can be attached to a (G) moiety which is attached as hereinafter described; (d) a moiety selected from the group consisting of (A), (D) and (E) can be attached to a moiety selected from the group consisting of (B), (C) and (F); (e) moiety (G) is attached to two carbon atoms in an acyclic structure, said moiety being separated from other (G) moieties and the sulfinyl group by at least two carbon atoms; (f) moiety (H) is attached to two moieties, one of which is selected from the group consisting of (B), (C), (F), (G) and the sulfinyl group, and the other of which is selected from the group consisting of (B), (C), (F) and (G); and (g) wherein moiety (I) is attached as a substituent to a moiety selected from the group consisting of (A), (B), (C), (D), (E), (F) and (H); said organic group containing from 1 to about 30 carbon atoms, and wherein R is attached to the sulfur atom of the sulfoxide group by a single covalent bond between carbon and sulfur, and wherein M is an alkali metal.

7. The compound of claim 6 wherein R is an organic group consisting of moieties selected from the group consisting of (A) alkyl moieties selected from the group consisting of straight chain and branched chain alkyl moieties containing from 1 to about 22 carbon atoms; (B) cycloaliphatic moieties containing from 5 to about 22 carbon atoms; (C) aryl moieties selected from the group consisting of phenyl, naphthyl and biphenyl moieties; (D) unsaturated hydrocarbon moieties selected from the group consitsing of straight chain and branched chain hydrocarbon moieties containing from 2 to about 22 carbon atoms and containing a double bond; (E) unsaturated hydrocarbon moieties selected from the group consisting of straight chain and branched chain hydrocarbon moieties containing from 2 to about 22 carbon atoms and containing a triple bond in an interior position; (F) heterocyclic moieties selected from the group consisting of sym-triazinyl, piperidinyl, imidazolyl, morpholino, pyrrolidyl, pyridyl, furyl, tetrahydrofuranyl, tetrahydropyranyl, oxazolyl, thiazolyl, tetrahydrothiophenyl, tetrahydrothiofuranyl, and benzoxazolyl moieties; (G) from 1 to about 10 moieties selected from the group consisting of either, thioether and imino linkages; (H) saturated alkylene moieties containing from 1 to about 12 carbon atoms; and (I) from 1 to about 5 amino group moieties; said moieties being attached to each other and to the sulfinyl group to form a complete group R according to the following: (a) a moiety selected from the group consisting of (A), (B), (C), (D), (E) and (F) can be the entire R group; (b) a moiety selected from the group consisting of (A), (B), (C), (D), (E), (F) and (H) can be attached directly to the sulfinyl group by means of a carbon atom; (c) a moiety selected from the group consisting of (A), (B), (C), (D), (E) and (F) can be attached to a (G) moiety which is attached as hereinafter described; (d) a moiety selected from the group consisting of (A), (D) and (E) can be attached to a moiety selected from the group consisting of (B), (C) and (F); (e) moiety (G) is attached to two carbon atoms in an acyclic structure, said moiety being separated from other (G) moieties and the sulfinyl group by at least two carbon atoms; (f) moiety (H) is attached to two moieties, one of which is selected from the group consisting of (B), (C), (F), (G) and the sulfinyl group, and the other of which is selected from the group consisting of (B), (C), (F) and (G); and (g) wherein moiety (I) is attached as a substituent to a moiety selected from the group consisting of (A), (B), (C), (D), (E), (F) and (H); said organic groups containing from 1 to about 30 carbon atoms, and wherein R is attached to the sulfur atom of the sulfoxide group by a single covalent bond between carbon and sulfur.

8. The compound of claim 6 wherein R is an organic group containing moieties selected from the group consisting of

| | |
|---|---|
| methyl; | biphenyl; |
| ethyl; | naphthyl; |
| n-propyl; | benzyl; |
| isopropyl; | 2-phenyldodecyl; |
| n-butyl; | 1-methyl-2-phenylethyl; |
| isobutyl; | 2-indenyl; |
| n-pentyl; | naphthylmethyl; |
| isopentyl; | 3,6,9,12,15-pentathiaheptacosanyl; |
| n-hexyl; | |
| n-heptyl; | 3,6,9,12,15-pentaoxaheptacosanyl; |
| n-octyl; | |
| isooctyl; | 3,6,9-trithiaheptacosanyl; |
| 2-ethylhexyl; | 3,6,9-trioxaheptacosanyl; |
| diisobutyl; | 2-dodecyloxyethyl; |
| n-nonyl; | 2-octadecyloxyethyl; |
| tripropylene; | 2-methoxyethyl; |
| n-decyl; | 2-ethoxyethyl; |
| undecyl; | 2-hexyloxyethyl; |
| n-dodecyl; | 2-octyloxyethyl; |
| tridecyl; | 2-dodecylthioethyl; |
| n-tetradecyl; | 2-octadecylthioethyl; |
| pentadecyl; | 2-methylthioethyl; |
| n-hexadecyl; | 2-ethylthioethyl; |
| n-octadecyl; | 2-hexylthioethyl; |
| eicosyl; | 2-octylthioethyl; |
| docosyl; | 11-methoxyundecyl; |
| vinyl; | 11-methylthioundecyl; |
| propenyl; | 11-ethoxyundecyl; |
| octenyl; | 9-methoxyoctadecyl; |
| 10-undecenyl; | 10-methoxyoctadecyl; |
| 9-octadecenyl; | 9-ethoxyoctadecyl; |
| cyclopentyl; | 10-ethoxyoctadecyl; |
| cyclohexyl; | 9-methylthiooctadecyl; |
| cyclohexylmethyl; | 10-methylthiooctadecyl; |
| methylcyclohexyl; | 2-methoxycyclohexyl; |
| 2-cyclohexyldodecyl; | 3-methoxycyclohexyl; |
| 12-cyclohexyldodecyl; | 4-methoxycyclohexyl; |
| 4-dodecylcyclohexyl; | 3-methylthiocyclohexyl; |
| propynyl; | 4-methylthiocyclohexyl; |
| phenyl; | 3-cyclohexyloxydecyl; |

2,5,8,11,14-pentamethyl-
3,6,9,12,15-pentaoxa-
heneicosanyl;
2-tetrahydrofuranyl;
tetrahydropyranyl;
β-(tetrahydropyranyl)-
ethyl;
β-(2-tetrahydrofuranyl)-
ethyl;
tetrahydrothiofuranyl;
3,6-dioxaheptyl;
3,6-dithiaheptyl;
3,6,9-triazaheneicosanyl;
β-aminoethyl;
β-aminopropyl;
β-methylaminoethyl;
β-methylaminopropyl;
β-dimethylaminoethyl;
β-dimethylaminopropyl;
5-amino-3-azapentyl;
5-dimethylamino-3-aza-
pentyl;
5-dimethylamino-3-meth-
azapentyl;

8-amino-3,6-diazaoctyl;
15-amino-3,6,9,12-tetraza-
pentadecyl;
4,6-dimethoxy-2-sym-
triazinyl;
4,6-diamino-2-sym-
triazinyl;
4-piperidyl;
β-(N-piperidyl)-ethyl;
β-(N-piperazinyl)-ethyl;
β-(N-imidazolyl)-ethyl;
β-(N-morpholino)-ethyl;
β-(N-oxazolyl)-ethyl;
β-(N-pyrrolidyl)-ethyl;
2-thiazolyl;
β-(N-anilino)-ethyl;
β-N-anilinopropyl;
β-N-pyridylethyl;
1-methoxy-2-indanyl;
β-N-naphthylaminoethyl;
2-benzoxazolyl;
4,6-dianilino-2-sym-
triazinyl;

and mixtures thereof.

9. The compound of claim 6 wherein R is an alkyl group containing from 1 to about 22 carbon atoms.

10. The compound of claim 6 wherein R is a methyl group.

11. Sulfoxide compounds having the formula

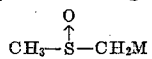

wherein M is an alkali metal.

12. The process of forming alkali metal salts of sulfinyl-substituted carbanions comprising the step of reacting a strong base selected from the group consisting of sodium metal, potassium metal, alkali metal amides, alkali metal hydrides, alkali metal oxides, and alkali metal alkyls with a sulfoxide compound having the formula

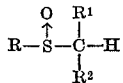

wherein R is an organic group consisting of moieties selected from the group consisting of (A) alkyl moieties selected from the group consisting of straight chain and branched chain alkyl moieties containing from 1 to about 22 carbon atoms; (B) cycloaliphatic moieties containing from 5 to about 22 carbon atoms; (C) aryl moieties selected from the group consisting of phenyl, naphthyl, and biphenyl moieties; (D) unsaturated hydrocarbon moieties selected from the group consisting of straight chain and branched chain hydrocarbon moieties containing from 2 to about 22 carbon atoms and containing a double bond; (E) unsaturated hydrocarbon moieties selected from the group consisting of straight chain and branched chain hydrocarbon moieties containing from 2 to about 22 carbon atoms and containing a triple bond in an interior position; (F) heterocyclic moieties selected from the group consisting of (1) five and (2) six membered rings containing from 1 to 3 hetero atoms selected from the group consisting of sulfur, nitrogen and oxygen and wherein said hetero atoms are attached only to carbon atoms and hydrogen atoms; (G) from 1 to about 10 moieties selected from the group consisting of ether, thioether and imino linkages; (H) saturated alkylene moieties containing from 1 to about 12 carbon atoms; and (I) from 1 to about 5 amino group moieties; said moieties being attached to each other and to the sulfinyl group to form a complete group R according to the following: (a) a moiety selected from the group consisting of (A), (B), (C), (D), (E) and (F) can be the entire R group; (b) a moiety selected from the group consisting of (A), (B), (C), (D), (E), (F) and (H) can be attached directly to the sulfinyl group by means of a carbon atom; (c) a moiety selected from the group consisting of (A), (B), (C), (D), (E) and (F) can be attached to a (G) moiety which is attached as hereinafter described; (d) a moiety selected from the group consisting of (A), (D) and (E) can be attached to a moiety selected from the group consisting of (B), (C) and (F); (e) moiety (G) is attached to two carbon atoms in an acyclic structure, said moiety being separated from other (G) moieties and the sulfinyl group by at least two carbon atoms; (f) moiety (H) is attached to two moieties, one of which is selected from the group consisting of (B), (C), (F), (G) and the sulfinyl group, and the other of which is selected from the group consisting of (B), (C), (F) and (G); and (g) wherein moiety (I) is attached as a substituent to a moiety selected from the group consisting of (A), (B), (C), (D), (E), (F) and (H); said organic group containing from 1 to about 30 carbon atoms, and wherein R is attached to the sulfur atom of the sulfoxide group by a single covalent bond between carbon and sulfur, where $R^1$ and $R^2$ are each selected from the group consisting of hydrogen and organic groups having the same definition as R and wherein the total number of carbon atoms in the sulfoxide compound does not exceed about 32, and not more than two of the organic groups in the compound contain aryl moieties, the reaction being carried out at a temperature of from about 0° C. to about 100° C.

13. The process of claim 12 wherein R is an organic group consisting of moieties selected from the group consisting of (A) alkyl moieties selected from the group consisting of straight chain and branched chain alkyl moieties containing from 1 to about 22 carbon atoms; (B) cycloaliphatic moieties containing from 5 to about 22 carbon atoms; (C) aryl moieties selected from the group consisting of phenyl, naphthyl and biphenyl moieties; (D) unsaturated hydrocarbon moieties selected from the group consisting of straight chain and branched chain hydrocarbon moieties containing from 2 to about 22 carbon atoms and containing a double bond; (E) unsaturated hydrocarbon moieties selected from the group consisting of straight chain and branched chain hydrocarbon moieties containing from 2 to about 22 carbon atoms and containing a triple bond in an interior position; (F) heterocyclic moieties selected from the group consisting of sym-triazinyl, piperidinyl, imidazolyl, morpholino, pyrrolidyl, pyridyl, furyl, tetrahydrofuranyl, tetrahydropyranyl, oxazolyl, thiazolyl, tetrahydrothiophenyl, tetrahydrothiofuranyl, and benzoxazolyl moieties; (G) from 1 to about 10 moieties selected from the group consisting of ether, thioether and imino linkages; (H) saturated alkylene moieties containing from 1 to about 12 carbon atoms; and (I) from 1 to about 5 amino group moieties; said moieties being attached to each other and to the sulfinyl group to form a complete group R according to the following: (a) a moiety selected from the group consisting of (A), (B), (C), (D), (E) and (F) can be the entire R group; (b) a moiety selected from the group consisting of (A), (B), (C), (D), (E), (F) and (H) can be attached directly to the sulfinyl group by means of a carbon atom; (c) a moiety selected from the group consisting of (A), (B), (C), (D), (E) and (F) can be attached to a (G) moiety which is attached as hereinafter described; (d) a moiety selected from the group consisting of (A), (D) and (E) can be attached to a moiety selected from the group consisting of (B), (C) and (F); (e) moiety (G) is attached to two carbon atoms in an acyclic structure, said moiety being separated from other (G) moieties and the sulfinyl group by at least two carbon atoms; (f) moiety (H) is attached to two moieties, one of which is selected from the group consisting of (B), (C), (F), (G) and the sulfinyl group, and the other of which is selected from the group consisting of (B), (C), (F) and (G); and (g) wherein moiety (I) is attached as a substituent to a moiety selected from the group consisting of (A), (B), (C), (D), (E), (F) and (H); said organic groups containing from 1 to about 30 carbon atoms, and wherein R is attached to the sulfur atom of the sulfoxide group by a single covalent bond between carbon and sulfur, and wherein $R^1$ and $R^2$ are each selected from the group consisting of hydrogen and organic groups having the same definition as R.

14. The process of claim 12 wherein R is an organic group containing moieties selected from the the group consisting of

| | |
|---|---|
| methyl; | 2-octylthioethyl; |
| ethyl; | 11-methoxyundecyl; |
| n-propyl; | 11-methylthioundecyl; |
| isopropyl; | 11-ethoxyundecyl; |
| n-butyl; | 9-methoxyoctadecyl; |
| isobutyl; | 10-methoxyoctadecyl; |
| n-pentyl; | 9-ethoxyoctadecyl; |
| isopentyl; | 10-ethoxyoctadecyl; |
| n-hexyl; | 9-methylthiooctadecyl; |
| n-heptyl; | 10-methylthiooctadecyl; |
| n-octyl; | 2-methoxycyclohexyl; |
| isooctyl; | 3-methoxycyclohexyl; |
| 2-ethylhexyl; | 4-methoxycyclohexyl; |
| diisobutyl; | 3-methylthiocyclohexyl; |
| n-nonyl; | 4-methylthiocyclohexyl; |
| tripropylene; | 3-cyclohexyloxydecyl; |
| n-decyl; | 2,5,8,11,14-pentamethyl- |
| undecyl; | 3,6,9,12,15-pentaoxa- |
| n-dodecyl; | heneicosanyl; |
| tridecyl; | 2-tetrahydrofuranyl; |
| n-tetradecyl; | tetrahydropyranyl; |
| pentadecyl; | β-(tetrahydropyranyl)- |
| n-hexadecyl; | ethyl; |
| n-octadecyl; | β-(2-tetrahydrofuranyl)- |
| eicosyl; | ethyl; |
| docosyl; | tetrahydrothiofuranyl; |
| vinyl; | 3,6-dioxaheptyl; |
| propenyl; | 3,6-dithiaheptyl; |
| octenyl; | 3,6,9-triazaheneicosanyl; |
| 10-undecenyl; | β-aminoethyl; |
| 9-octadecenyl; | β-aminopropyl; |
| cyclopentyl; | β-methylaminoethyl; |
| cyclohexyl; | β-methylaminopropyl; |
| cyclohexylmethyl; | β-dimethylaminoethyl; |
| methylcyclohexyl; | β-dimethylaminopropyl; |
| 2-cyclohexyldodecyl; | 5-amino-3-azapentyl; |
| 12-cyclohexyldodecyl; | 5-dimethylamino-3-aza- |
| 4-dodecylcyclohexyl; | pentyl; |
| propynyl; | 5-dimethylamino-3-meth- |
| phenyl; | azapentyl; |
| biphenyl; | 8-amino-3,6-diazaoctyl; |
| naphthyl, | 15-amino-3,6,9,12-tetraza- |
| benzyl; | pentadecyl; |
| 2-phenyldodecyl; | 4,6-dimethoxy-2-sym- |
| 1-methyl-2-phenylethyl; | triazinyl; |
| 2-indenyl; | 4,6-diamino-2-sym- |
| naphthylmethyl; | triazinyl; |
| 3,6,9,12,15-pentathia- | 4-piperidyl; |
| heptacosanyl; | β-(N-piperidyl)ethyl; |
| 3,6,9,12,15-pentaoxahepta- | β-(N-piperazinyl)-ethyl; |
| cosanyl; | β-(N-imidazolyl)-ethyl; |
| 3,6,9-trithiaheptacosanyl; | β-(N-morpholino)-ethyl; |
| 3,6,9-trioxaheptacosanyl; | β-(N-oxazolyl)-ethyl; |
| 2-dodecyloxyethyl; | β-(N-pyrrolidyl)-ethyl; |
| 2-octadecyloxyethyl; | 2-thiazolyl; |
| 2-methoxyethyl; | β-(N-anilino)-ethyl; |
| 2-ethoxyethyl; | β-N-anilinopropyl; |
| 2-hexyloxyethyl; | β-N-pyridylethyl; |
| 2-octyloxyethyl; | 1-methoxy-2-indanyl; |
| 2-dodecylthioethyl; | β-N-naphthylaminoethyl; |
| 2-octadecylthioethyl; | 2-benzoxazolyl; |
| 2-methylthioethyl; | 4,6-dianilino-2-sym- |
| 2-ethylthioethyl; | trazinyl; |
| 2-hexylthioethyl; | | and mixtures thereof, and wherein $R^1$ and $R^2$ are each selected from the group consisting of hydrogen and organic groups having the same definition as R.

15. The process of claim 12 wherein R is an alkyl group containing from 1 to about 22 carbon atoms and wherein $R^1$ and $R^2$ are hydrogen atoms.

16. The process of claim 12 in which the sulfoxide compound is dimethyl sulfoxide.

17. The process of forming a mixture of alkali metal salts of sulfinyl carbanions and alkali metal alkanesulfenates comprising the step of reacting a strong base selected from the group consisting of sodium metal and potassium metal with a sulfoxide compound having the formula

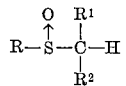

wherein R is an organic group consisting of moieties selected from the group consisting of (A) alkyl moieties selected from the group consisting of straight chain and branched chain alkyl moieties containing from 1 to about 22 carbon atoms; (B) cycloaliphatic moieties containing from 5 to about 22 carbon atoms; (C) aryl moieties selected from the group consisting of phenyl, naphthyl, and biphenyl moieties; (D) unsaturated hydrocarbon moieties selected from the group consisting of straight chain and branched chain hydrocarbon moieties containing from 2 to about 22 carbon atoms and containing a double bond; (E) unsaturated hydrocarbon moieties selected from the group consisting of straight chain and branched chain hydrocarbon moieties containing from 2 to about 22 carbon atoms and containing a triple bond in an interior position; (F) heterocyclic moieties selected from the group consisting of (1) five and (2) six membered rings containing from 1 to 3 hetero atoms selected from the group consisting of sulfur, nitrogen and oxygen and wherein said hetero atoms are attached only to carbon atoms and hydrogen atoms; (G) from 1 to about 10 moieties selected from the group consisting of ether, thioether and imino linkages; (H) saturated alkylene moieties containing from 1 to about 12 carbon atoms; and (I) from 1 to about 5 amino group moieties; said moieties being attached to each other and to the sulfinyl group to form a complete group R according to the following: (a) a moiety selected from the group consisting of (A), (B), (C), (D), (E) and (F) can be the entire R group; (b) a moiety selected from the group consisting of (A), (B), (C), (D), (E), (F) and (H) can be attached directly to the sulfinyl group by means of a carbon atom; (c) a moiety selected from the group consisting of (A), (B), (C), (D), (E) and (F) can be attached to a (G) moiety which is attached as hereinafter described; (d) a moiety selected from the group consisting of (A), (D) and (E) can be attached to a moiety selected from the group consisting of (B), (C) and (F); (e) moiety (G) is attached to two carbon atoms in an acyclic structure, said moiety being separated from other (G) moieties and the sulfinyl group by at least two carbon atoms; (f) moiety (H) is attached to two moieties, one of which is selected from the group consisting of (B), (C), (F), (G) and the sulfinyl group, and the other of which is selected from the group consisting of (B), (C), (F) and (G); and (g) wherein moiety (I) is attached as a substituent to a moiety selected from the group consisting of (A), (B), (C), (D), (E), (F) and (H); said organic group containing from 1 to about 30 carbon atoms, and wherein R is attached to the sulfur atom of the sulfoxide group by a single covalent bond between carbon and sulfur, wherein $R^1$ and $R^2$ are each selected from the group consisting of hydrogen and organic groups having the same definition as R and wherein the total number of carbon atoms in the sulfoxide compound does not exceed about 32, and not more than two of the hydrocarbon groups in the compound contain aryl groups, the reaction being carried out at a temperature of from about 0° C. to about 100 C.

18. The process of preparing alkali metal alkanesulfenates comprising the process of claim 17 and as an additional step, reacting the mixture of alkali metal salts of sulfinyl carbanions and alkali metal alkane sulfenates prepared by said process of claim 12 with a stoichiometric amount, corresponding to the amount of alkali metal sulfinyl carbanions, of a compound selected from the group consisting of t-alkyl halides and compounds which are more acidic than dimethyl sulfoxide whereby the alkali metal salts of sulfinyl carbanions are preferentially reacted leaving essentially only the alkali metal alkanesulfenates.

19. The process of alkylating a compound having the formula

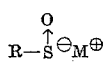

wherein R is an organic group consisting of moieties selected from the group consisting of (A) alkyl moieties selected from the group consisting of straight chain and branched chain alkyl moieties containing from 1 to about 22 carbon atoms; (B) cycloaliphatic moieties containing from 5 to about 22 carbon atoms; (C) aryl moieties selected from the group consisting of phenyl, naphthyl and biphenyl moieties; (D) unsaturated hydrocarbon moieties selected from the group consisting of straight chain and branched chain hydrocarbon moieties containing from 2 to about 22 carbon atoms and containing a double bond; (E) unsaturated hydrocarbon moieties selected from the group consisting of straight chain and branched chain hydrocarbon moieties containing from 2 to about 22 carbon atoms and containing a triple bond in an interior position; (F) heterocyclic moieties selected from the group consisting of (1) five and (2) six membered rings containing from 1 to 3 hetero atoms selected from the group consisting of sulfur, nitrogen and oxygen and wherein said hetero atoms are attached only to carbon atoms and hydrogen atoms; (G) from 1 to about 10 moieties selected from the group consisting of ether, thioether and amino linkages; (H) saturated alkylene moieties containing from 1 to about 12 carbon atoms; and (I) from 1 to about 5 amino group moieties; said moieties being attached to each other and to the sulfinyl group to form a complete group R according to the following: (a) a moiety selected from the group consisting of (A), (B), (C), (D), (E) and (F) can be the entire R group; (b) a moiety selected from the group consisting of (A), (B), (C), (D), (E), (F) and (H) can be attached directly to the sulfinyl group by means of a carbon atoms; (c) a moiety selected from the group consisting of (A), (B), (C), (D), (E) and (F) can be attached to a (G) moiety which is attached as hereinafter described; (d) a moiety selected from the group consisting of (A), (D) and (E) can be attached to a moiety selected from the group consisting of (B), (C) and (F); (e) moiety (G) is attached to two carbon atoms in an acyclic structure, said moiety being separated from other (G) moieties and the sulfinyl group by at least two carbon atoms; (f) moiety (H) is attached to two moieties, one of which is selected from the group consisting of (B), (C), (F), (G) and the sulfinyl group, and the other of which is selected from the group consisting of (B), (C), (F) and (G); and (g) wherein moiety (I) is attached as a substituent to a moiety selected from the group consisting of (A), (B), (C), (D), (E), (F) and (H); said organic group containing from 1 to about 30 carbon atoms, and wherein R is attached to the sulfur atom of the sulfoxide group by a single covalent bond between carbon and sulfur, and wherein the total number of carbon atoms in the sulfoxide compound does not exceed about 32, and not more than two of the organic groups in the compound contain aryl moieties, and wherein M is an alkali metal, comprising the step of reacting said compound with an alkyl halide having the formula $$R^3-CH_2-X$$

wherein X is selected from the group consisting of bromine, chlorine, and iodine atoms, and wherein $R^3$ is selected from the group consisting of hydrogen and organic groups consisting of moieties selected from the group consisting of (A) alkyl moieties selected from the group consisting of straight chain and branched chain alkyl moieties containing from 1 to about 22 carbon atoms; (B) cycloaliphatic moieties containing from 5 to about 22 carbon atoms; (C) aryl moieties selected from the group consisting of phenyl, naphthyl and biphenyl moieties; (D) unsaturated hydrocarbon moieties selected from the group consisting of straight chain and branched chain hydrocarbon moieties containing from 2 to about 22 carbon atoms and containing a double bond; (E) from 1 to about 10 moieties selected from the group consisting of ether and thioether moieties; said moieties being attached to each other and to the $CH_2$ group to form a complete group $R^3$ according to the following: (a) a group consisting of (A), (B) and (D) can be the entire $R^3$ group; (b) a moiety selected from the group consisting of (A), (B), (D) and (F) can be attached directly to the $CH_2$ group; (c) a moiety selected from the group consisting of (A), (B), (C), (D) and (F) can be attached to an (E) moiety which is attached as hereinafter described; (d) a moiety selected from the group consisting of (A), (B) and (D) can be attached to a (C) moiety; (e) moiety (G) is attached to two carbon atoms in an acyclic structure, said moiety being separated from other (G) moieties by at least two carbon atoms; (f) moiety (F) is attached to two moieties, one of which is selected from the group consisting of (C), (E) and the $CH_2$ group and the other of which is selected from the group consisting of (C) and (E); said organic group containing from 1 to about 30 carbon atoms, and wherein the carbon of $R^3$ joining $R^3$ to the $CH_2$ group is attached to the rest of the $R^3$ group by a single covalent bond, the reaction being carried out at a temperature of from about 0° C. to about 100° C.

20. The process of alkylating a compound having the formula

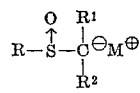

wherein R is an organic group consisting of moieties selected from the group consisting of (A) alkyl moieties selected from the group consisting of straight chain and branched chain alkyl moieties containing from 1 to about 22 carbon atoms; (B) cycloaliphatic moieties containing from 5 to about 22 carbon atoms; (C) aryl moieties selected from the group consisting of phenyl, naphthyl and biphenyl moieties; (D) unsaturated hydrocarbon moieties selected from the group consisting of straight chain and branched chain hydrocarbon moieties containing from 2 to about 22 carbon atoms and containing a double bond; (E) unsaturated hydrocarbon moieties selected from the group consisting of straight chain and branched chain hydrocarbon moieties containing from 2 to about 22 carbon atoms and containing a triple bond in an interior position; (F) heterocyclic moieties selected from the group consisting of (1) five and (2) six membered rings containing from 1 to 3 hetero atoms selected from the group consisting of sulfur, nitrogen and oxygen and wherein said hetero atoms are attached only to carbon atoms and hydrogen atoms; (G) from 1 to about 10 moieties selected from the group consisting of ether, thioether and imino linkages; (H) saturated alkylene moieties containing from 1 to about 12 carbon atoms; and (I) from 1 to about 5 amino group moieties; said moieties being attached to each other and to the sulfinyl group to form a complete group R according to the following: (a) a moiety selected from the group consisting of (A), (B), (C), (D), (E) and (F) can be the entire R group; (b) a moiety selected from the group consisting of (A), (B), (C), (D), (E), (F) and (H) can be attached directly to the sulfinyl group by means of a carbon atom; (c) a moiety selected from the group consisting of (A), (B), (C), (D), (E) and (F) can be attached to a (G) moiety which is attached as hereinafter described; (d) a moiety selected from the group consisting of (A), (D) and (E) can be attached to a moiety selected from the group consisting of (B), (C) and (F); (e) moiety (G) is attached to two carbon atoms in an acyclic structure, said moiety being separated from other (G) moieties and the sulfinyl group by at least two carbon atoms; (f) moiety (H) is attached to two moieties, one of which is selected from the group consisting of (B), (C), (F), (G) and the sulfinyl group, and the other of which is selected from the group consisting of (B), (C), (F) and (G); and (g) wherein moiety (I) is attached as a substituent to a moiety selected from the group consisting of (A), (B), (C), (D), (E), (F) and (H); said organic group containing from 1 to about 30 carbon atoms, and wherein R is attached to the sulfur atom of the sulfoxide group by a single covalent bond between carbon and sulfur, where $R^1$ and $R^2$ are each selected from the group consisting of hydrogen and organic groups having the same definition as R, and wherein the total number of carbon atoms in the sulfoxide compound does not exceed about 32, and not more than two of the organic groups in the compound contain aryl moities, and wherein M is an alkali metal, comprising the step of reacting said compound with an alkyl halide having the formula $$R^3-CH_2-X$$

wherein X is selected from the group consisting of bromine, chlorine, and iodine atoms, and wherein $R_3$ is selected from the group consisting of hydrogen and organic groups consisting of moieties selected from the group consisting of (A) alkyl moieties selected from the group consisting of straight chain and branched chain alkyl moieties containing from 1 to about 22 carbon atoms; (B) cycloaliphatic moieties containing from 5 to about 22 carbon atoms; (C) aryl moieties selected from the group consisting of phenyl, naphthyl and biphenyl moieties; (D) unsaturated hydrocarbon moieties selected from the group consisting of straight chain and branched chain hydrocarbon moieties containing from 2 to about 22 carbon atoms and containing a double bond; (E) from 1 to about 10 moieties selected from the group consisting of ether and thioether moieties; said moieties being attached to each other and to the $CH_2$ group to form a complete group $R^3$ according to the following: (a) a group consisting of (A), (B) and (D) can be the entire $R^3$ group; (b) a moiety selected from the group consisting of (A), (B), (D) and (F) can be attached directly to the $CH_2$ group; (c) a moiety selected from the group consisting of (A), (B), (C), (D) and (F) can be attached to an (E) moiety which is attached as hereinafter described; (d) a moiety selected from the group consisting of (A), (B) and (D) can be attached to a (C) moiety; (e) moiety (G) is attached to two carbon atoms in an acyclic structure, said moiety being separated from other (G) moieties by at least two carbon atoms; (f) moiety (F) is attached to two moieties, one of which is selected from the group consisting of (C), (E) and the $CH_2$ group and the other of which is selected from the group consisting of (C) and (E); said organic group containing from 1 to about 30 carbon atoms, and wherein the carbon of $R^3$ joining $R^3$ to the $CH_2$ group is attached to the rest of the $R^3$ group by a single covalent bond, the reaction being carried out at a temperature of from about 0° C. to about 100° C.

No references cited.

CHARLES B. PARKER, *Primary Examiner.*

DELBERT R. PHILLIPS, *Assistant Examiner.*

UNITED STATES PATENT OFFICE
CERTIFICATE OF CORRECTION

Patent No. 3,288,860                    November 29, 1966

Warren I. Lynness et al.

It is hereby certified that error appears in the above numbered patent requiring correction and that the said Letters Patent should read as corrected below.

Column 4, line 58, for "The" read -- (The --; lines 70 to 74, after the formula, insert a period and a closing parenthesis; column 5, lines 20 to 23, the lower right-hand portion of the formula should appear as shown below instead of as in the patent:

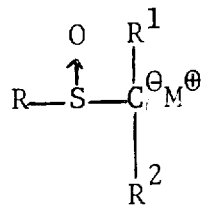

column 7, line 41, for "an daryl-sub-" read -- and aryl-sub- --; column 11, line 48, for "in" read -- an --; column 16, line 75, for "2" read -- 22 --; column 23, line 53, for "atoms" read -- atom --.

Signed and sealed this 19th day of September 1967.

(SEAL)
Attest:

ERNEST W. SWIDER                    EDWARD J. BRENNER
Attesting Officer               Commissioner of Patents